United States Patent
Watarai et al.

(10) Patent No.: US 9,422,993 B2
(45) Date of Patent: Aug. 23, 2016

(54) ROTOR COVER, ROTOR COOLING APPARATUS, AND TEMPERATURE-LEVEL INDICATOR

(71) Applicant: SHIMANO INC., Sakai (JP)

(72) Inventors: Etsuyoshi Watarai, Sakai (JP); Tatsuya Matsushita, Sakai (JP); Kazuki Koshiyama, Sakai (JP); Shingo Sakurai, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/444,981

(22) Filed: Jul. 28, 2014

(65) Prior Publication Data

US 2016/0025164 A1    Jan. 28, 2016

(51) Int. Cl.
| F16D 65/12 | (2006.01) |
| F16D 65/847 | (2006.01) |
| G01K 11/12 | (2006.01) |
| F16D 55/00 | (2006.01) |
| F16D 66/00 | (2006.01) |

(52) U.S. Cl.
CPC .............. *F16D 65/12* (2013.01); *F16D 65/128* (2013.01); *F16D 65/847* (2013.01); *G01K 11/12* (2013.01); *F16D 2055/0037* (2013.01); *F16D 2066/001* (2013.01)

(58) Field of Classification Search
CPC .......... F16D 2055/0037; F16D 65/847; F16D 65/125; F16D 65/827; F16D 13/72; B62J 23/00
USPC ....... 188/218 XL, 218 A, 218 R, 716, 264 A, 188/264 D, 264 R, 264 AA, 264 W
See application file for complete search history.

(56) References Cited

U.S. PATENT DOCUMENTS

| | | | | | |
|---|---|---|---|---|---|
| 4,226,308 | A | * | 10/1980 | Nishiyama | F16D 55/22 188/218 A |
| 4,326,610 | A | * | 4/1982 | Mouza | F16D 53/00 188/218 A |
| 4,596,312 | A | * | 6/1986 | Kawaguchi | B62L 1/00 188/18 A |
| 6,364,071 | B2 | * | 4/2002 | Aydt | F16D 65/10 188/218 R |
| 7,337,884 | B2 | * | 3/2008 | Paulik | F16D 65/847 188/264 A |
| 7,341,130 | B2 | * | 3/2008 | Samuelsson | F16D 55/00 188/218 A |
| 2009/0266655 | A1 | * | 10/2009 | Mikura | B62J 23/00 188/218 A |
| 2014/0102822 | A1 | * | 4/2014 | Hara | B62J 23/00 180/206.1 |
| 2015/0003765 | A1 | * | 1/2015 | Inoue | F16D 65/12 384/477 |

* cited by examiner

*Primary Examiner* — Thomas J Williams
*Assistant Examiner* — Mariano Sy
(74) *Attorney, Agent, or Firm* — Mori & Ward, LLP

(57) ABSTRACT

A rotor cover comprises a cover portion and a mounting portion. The cover portion is configured to at least partially cover a disc brake rotor mounted on a bicycle hub assembly. The mounting portion is configured to be mounted on the bicycle hub assembly.

23 Claims, 17 Drawing Sheets

ROTOR COVER, ROTOR COOLING APPARATUS, AND TEMPERATURE-LEVEL INDICATOR

BACKGROUND OF THE INVENTION

1. Field of the Invention

The present invention relates to a rotor cover, a rotor cooling apparatus, and a temperature-level indicator.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a disc brake system. A disc brake system includes a disc brake rotor, a disc brake caliper, and a brake operating device.

SUMMARY OF THE INVENTION

In accordance with a first aspect of the present invention, a rotor cover comprises a cover portion and a mounting portion. The cover portion is configured to at least partially cover a disc brake rotor mounted on a bicycle hub assembly. The mounting portion is configured to be mounted on the bicycle hub assembly.

In accordance with a second aspect of the present invention, the rotor cover according to the first aspect is configured so that the cover portion is radially outwardly extending from the mounting portion with respect to a rotational center axis of the bicycle hub assembly.

In accordance with a third aspect of the present invention, the rotor cover according to the first aspect is configured so that the mounting portion is configured to be secured relative to a bicycle frame with a wheel securing structure of the bicycle hub assembly.

In accordance with a fourth aspect of the present invention, the rotor cover according to the third aspect is configured so that the mounting portion is configured to be positioned between the bicycle frame and a lock member of the wheel securing structure.

In accordance with a fifth aspect of the present invention, the rotor cover according to the fourth aspect further comprises a spacer positioned between the bicycle frame and the mounting portion.

In accordance with a sixth aspect of the present invention, the rotor cover according to the fifth aspect is configured so that the spacer is configured to prevent the mounting portion from contacting a protrusion extending from a fork end of the bicycle frame.

In accordance with a seventh aspect of the present invention, the rotor cover according to the first aspect is configured so that at least one of the cover portion and the mounting portion is configured to avoid contacting a protrusion extending from a fork end of the bicycle frame.

In accordance with an eighth aspect of the present invention, the rotor cover according to the first aspect is configured so that the mounting portion is configured to be mounted on an outer surface of a hub axle of the bicycle hub assembly.

In accordance with a ninth aspect of the present invention, the rotor cover according to the first aspect is configured so that the mounting portion is configured to be mounted on an inner surface of a hub axle of the bicycle hub assembly.

In accordance with a tenth aspect of the present invention, the rotor cover according to the first aspect further comprises a weight attached to the cover portion. The weight is disposed below the mounting portion in a state where the mounting portion is mounted on the bicycle hub assembly.

In accordance with an eleventh aspect of the present invention, the rotor cover according to the first aspect is configured so that a maximum outer radius of the cover portion is greater than or equal to a maximum outer radius of the disc brake rotor.

In accordance with a twelfth aspect of the present invention, the rotor cover according to the first aspect is configured so that at least one of the cover portion and the mounting portion is made of a metallic material.

In accordance with a thirteenth aspect of the present invention, the rotor cover according to the first aspect is configured so that at least one of the cover portion and the mounting portion is made of a resin material.

In accordance with a fourteenth aspect of the present invention, the rotor cover according to the first aspect further comprises an air intake configured to intake air into a space between the cover portion and the disc brake rotor.

In accordance with a fifteenth aspect of the present invention, the rotor cover according to the fourteenth aspect is configured so that the air intake includes an inlet opening configured to face toward a traveling direction of a bicycle.

In accordance with a sixteenth aspect of the present invention, the rotor cover according to the first aspect is configured so that the cover portion includes a plurality of holes configured to reduce force applied to the cover portion from cross wind.

In accordance with a seventeenth aspect of the present invention, a rotor cover comprises a shock sensor and a cover portion. The shock sensor is configured to sense shock applied to a bicycle. The cover portion is configured to at least partially cover a disc brake rotor. The cover portion is spreadable to at least cover the disc brake rotor from a retracted state based on the shock sensed by the shock sensor.

In accordance with an eighteenth aspect of the present invention, a rotor cooling apparatus comprises a shock sensor and a coolant supplier. The shock sensor is configured to sense shock applied to a bicycle. The coolant supplier is configured to supply a coolant to a disc brake rotor based on the shock sensed by the shock sensor.

In accordance with a nineteenth aspect of the present invention, a temperature-level indicator comprises an indicating member configured to indicate a temperature level of at least one of a disc brake rotor and a rotor cover which is configured to at least partially cover the disc brake rotor.

In accordance with a twentieth aspect of the present invention, the temperature-level indicator according to the nineteenth aspect is configured so that the indicating member is configured to be attached to the disc brake rotor and is configured to change a color of the indicating member in accordance with the temperature level of the disc brake rotor.

In accordance with a twenty-first aspect of the present invention, the temperature-level indicator according to the nineteenth aspect is configured so that the indicating member is configured to be attached to the rotor cover and is configured to change a color of the indicating member in accordance with the temperature level of the rotor cover.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
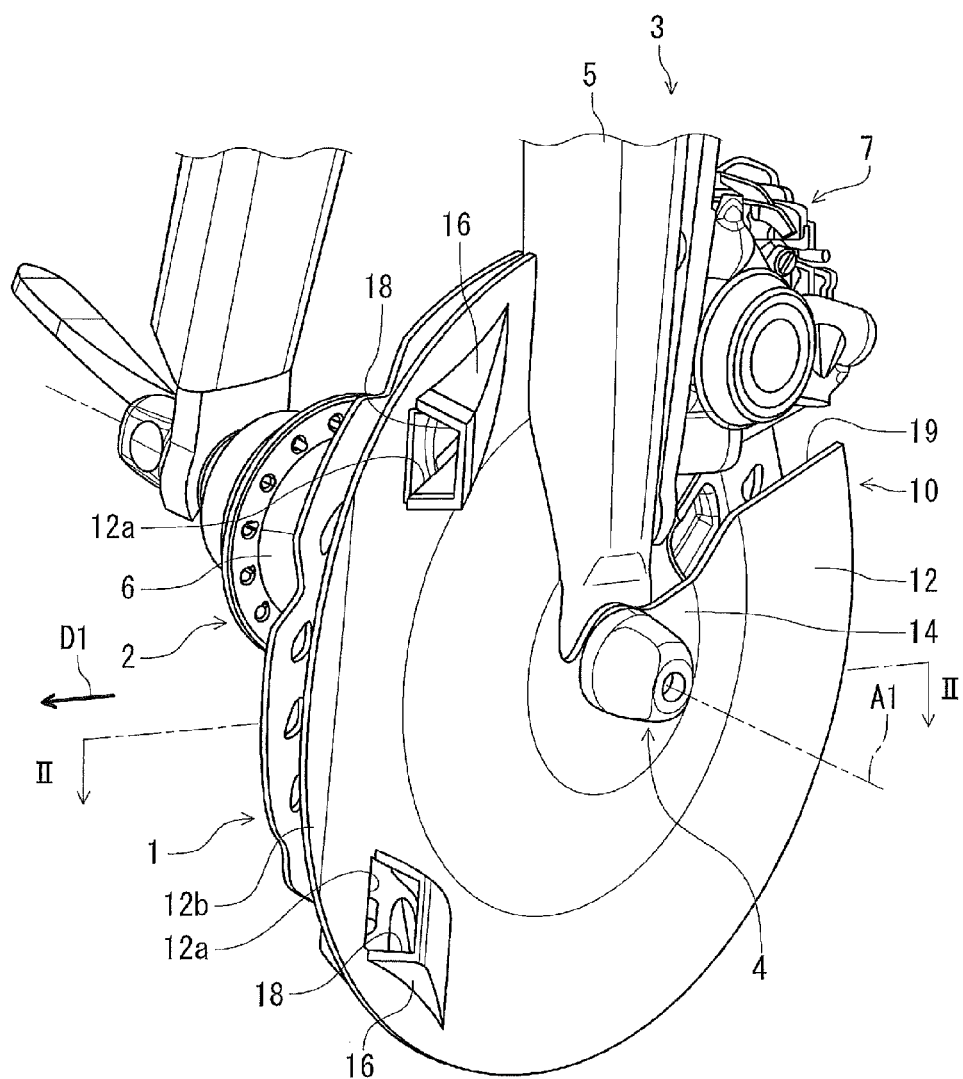
FIG. 1 is a perspective view of a rotor cover in accordance with a first embodiment which is mounted on a bicycle hub assembly.

The embodiments will now be described with reference to the accompanying drawings, wherein like reference numerals designate corresponding or identical elements throughout the various drawings.

First Embodiment

Referring initially to FIG. 1, a rotor cover 10 in accordance with a first embodiment comprises a cover portion 12 and a mounting portion 14. The cover portion 12 is configured to at least partially cover a disc brake rotor 1 mounted on a bicycle hub assembly 2. The mounting portion 14 is configured to be mounted on the bicycle hub assembly 2. The cover portion 12 is radially outwardly extending from the mounting portion 14 with respect to a rotational center axis A1 of the bicycle hub assembly 2. In the illustrated embodiment, the cover portion 12 is integrally provided with the mounting portion 14 as a single unitary member. However, the cover portion 12 can be a separate member from the mounting portion 14 if needed and/or desired.

At least one of the cover portion 12 and the mounting portion 14 is made of a metallic material. In the illustrated embodiment, the cover portion 12 and the mounting portion 14 are made of the metallic material such as aluminum, iron, titanium, or stainless steel. However, at least one of the cover portion 12 and the mounting portion 14 can be made of material other than the metallic material if needed and/or desired. For example, at least one of the cover portion 12 and the mounting portion 14 can be made of a resin material if needed and/or desired. In a case where the cover portion 12 is a separate member from the mounting portion 14, the cover portion 12 can be made of material different from material of the mounting portion 14. For example, the cover portion 12 can be made of a resin material while the mounting portion 14 is made of a metallic material.

The mounting portion 14 is configured to be secured relative to a bicycle frame 3 with a wheel securing structure 4 of the bicycle hub assembly 2. In the illustrated embodiment, the mounting portion 14 is configured to be secured relative to a front fork 5 of the bicycle frame 3 with the wheel securing structure 4. However, the mounting portion 14 can be secured relative to portions other than the front fork 5 in the bicycle frame 3. In the illustrated embodiment, the wheel securing structure 4 is configured to releasably couple the bicycle hub assembly 2 to the front fork 5 of the bicycle frame 3.

The disc brake rotor 1 is rotatable relative to the bicycle frame 3 (e.g., the front fork 5) about the rotational center axis A1. The disc brake rotor 1 is mounted on a hub shell 6 of the bicycle hub assembly 2. A disc brake caliper 7 is mounted to the front fork 5 to apply a braking force to the disc brake rotor 1.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the rotor cover 10, should be interpreted relative to the bicycle equipped with the rotor cover 10 as used in an upright riding position on a horizontal surface.

As seen in FIG. 1, the rotor cover 10 further comprises an air intake 16 configured to intake air into a space S1 (FIG. 2) between the cover portion 12 and the disc brake rotor 1. In the illustrated embodiment, the rotor cover 10 comprises a pair of air intakes 16 configured to intake air into the space S1 between the cover portion 12 and the disc brake rotor 1.

The air intake 16 includes an inlet opening 18 configured to face toward a traveling direction D1 of a bicycle. The traveling direction D1 of the bicycle is a direction in which the bicycle forward moves in a straight line during the pedaling. The traveling direction D1 can be also defined as a front direction of the bicycle.

The inlet opening 18 forward faces when the bicycle moves in the traveling direction D1. The cover portion 12 includes a pair of outlet openings 12a. The air intakes 16 are provided on the cover portion 12 to cover the outlet openings 12a. Air flows through the inlet openings 18 and the outlet openings 12a into the space S1 between the cover portion 12 and the disc brake rotor 1.

The cover portion 12 includes an inclined part 12b. The inclined part 12b is inclined relative to the traveling direction D1 in a state where the rotor cover 10 is mounted to the front fork 5 of the bicycle frame 3. The inclined part 12b is provided on a front side relative to the mounting portion 14. The inclined part 12b is configured to guide air to the space S1 between the cover portion 12 and the disc brake rotor 1.

The rotor cover 10 further comprises a cutout 19 to avoid interference between the rotor cover 10 and each of the front fork 5 and the disc brake caliper 7. In the illustrated embodiment, the cutout 19 is provided on the cover portion 12 and the mounting portion 14. However, the cutout 19 can be provided only on the cover portion 12 if needed and/or desired. Furthermore, the cutout 19 can be omitted from the rotor cover 10 if the rotor cover 10 is provided to avoid the interference between the rotor cover 10 and each of the front fork 5 and the disc brake caliper 7.

Figure 2:
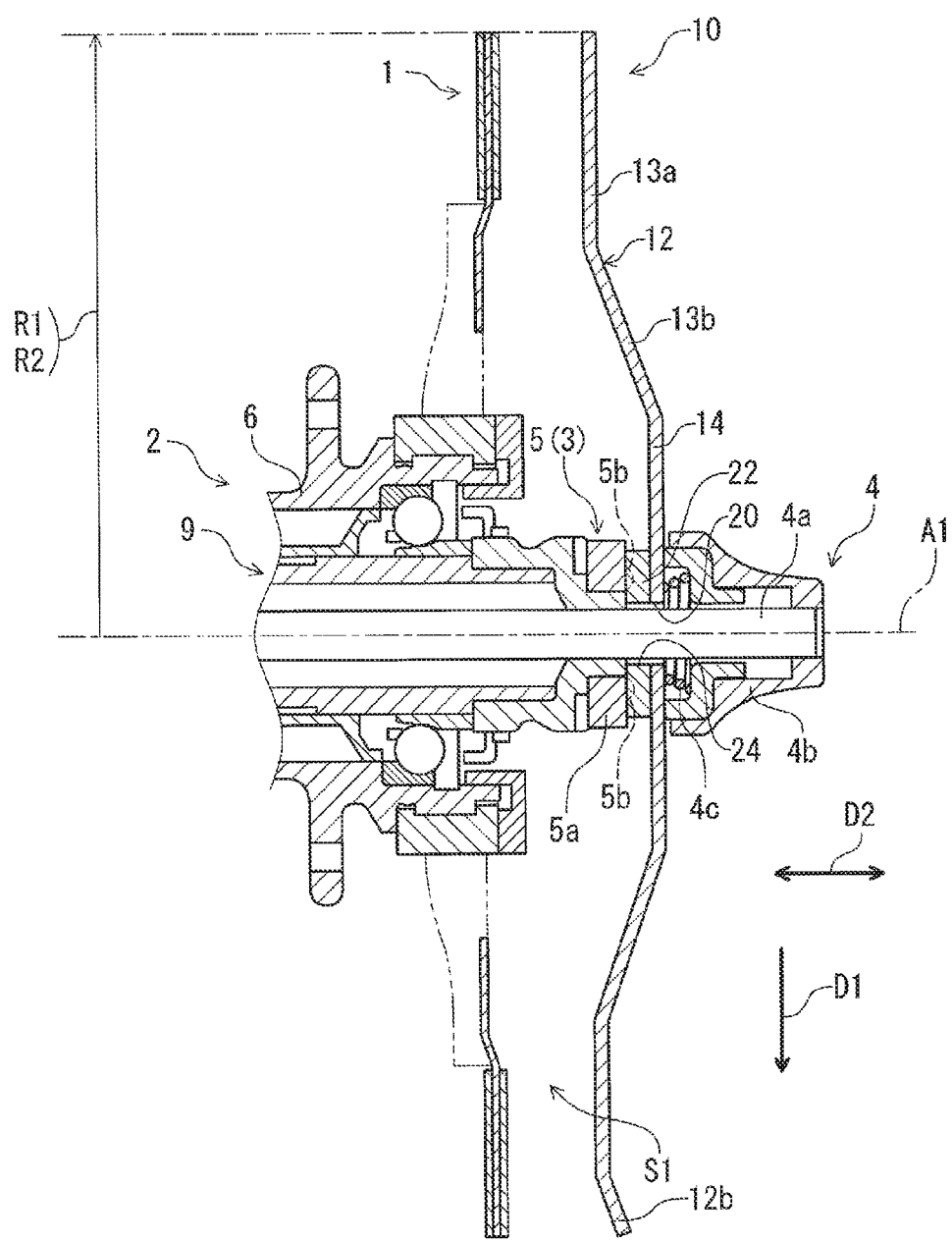
FIG. 2 is a cross-sectional view of a disc brake rotor, the bicycle hub assembly, and the rotor cover taken along line II-II of FIG. 1.

As seen in FIG. 2, the mounting portion 14 is configured to be mounted on an outer surface of a rod 4a of the wheel securing structure 4. In the illustrated embodiment, the mounting portion 14 includes a first through-hole 20. The rod 4a extends through the first through-hole 20. The rod 4a extends through a hub axle 9 of the bicycle hub assembly 2. The hub axle 9 rotatably supports the hub shell 6 about the rotational center axis A1. The rotor cover 10 is mounted to the front fork 5 of the bicycle frame 3 together with the bicycle hub assembly 2.

The mounting portion 14 is configured to be positioned between the bicycle frame 3 and a lock member 4b of the wheel securing structure 4. The lock member 4b is secured to an end of the rod 4a. The mounting portion 14 contacts the lock member 4b in a state where the rotor cover 10 is mounted to the front fork 5 of the bicycle frame 3 with the wheel securing structure 4. The wheel securing structure 4 includes a biasing member 4c configured to be compressed between the front fork 5 and the lock member 4b. In the illustrated embodiment, the biasing member 4c is provided between the lock member 4b and the mounting portion 14 of the rotor cover 10.

A maximum outer radius of the cover portion 12 is greater than or equal to a maximum outer radius of the disc brake rotor 1. In the illustrated embodiment, a maximum outer radius R1 of the cover portion 12 is substantially equal to a maximum outer radius R2 of the disc brake rotor 1. However, the maximum outer radius of the cover portion 12 can be greater or smaller than the maximum outer radius of the disc brake rotor 1 if needed and/or desired. The maximum outer radii R1 and R2 are defined based on the rotational center axis A1. The cover portion 12 includes an offset part 13a provided radially outward of the mounting portion 14 with respect to the rotational center axis A1 of the bicycle hub assembly 2. The offset part 13a is offset from the mounting portion 14 in an axial direction D2 parallel to the rotational center axis A1. The cover portion 12 includes a coupling part 13b coupling the offset part 13a to the mounting portion 14. The coupling part 13b extends from the mounting portion 14 to the cover portion 12 to be inclined with respect to the axial direction D2.

As seen in FIG. 2, at least one of the cover portion 12 and the mounting portion 14 is configured to avoid contacting a protrusion 5b extending from a fork end 5a of the bicycle frame 3. In the illustrated embodiment, the cover portion 12 and the mounting portion 14 are configured to avoid contacting a pair of protrusions 5b extending from the fork end 5a of the bicycle frame 3.

Figure 3:
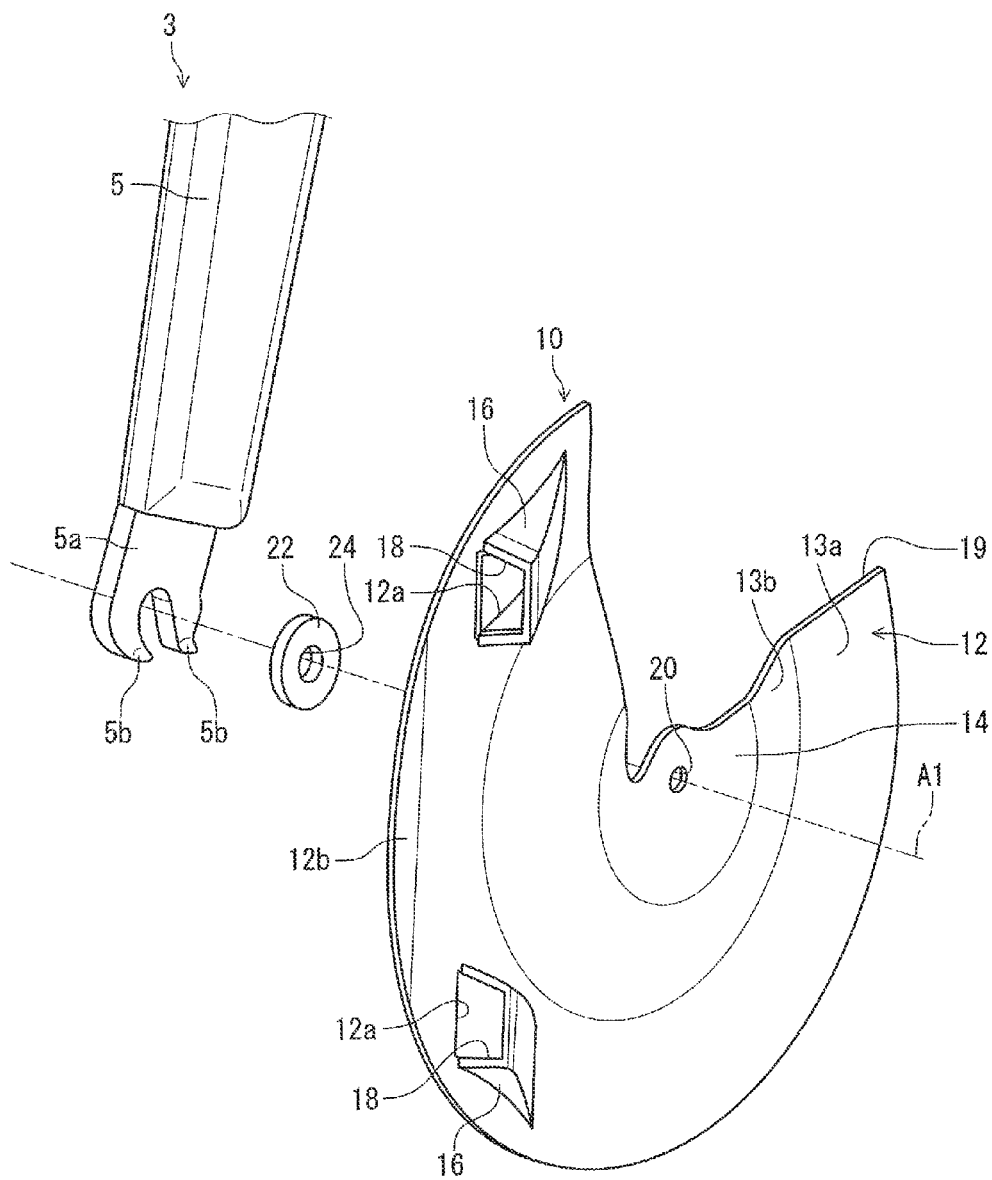
FIG. 3 is an exploded perspective view of a front fork, a spacer, and the rotor cover illustrated in FIG. 1.

As seen in FIG. 3, the protrusions 5b are provided on the fork end 5a to extend from the fork end 5a toward the mounting portion 14. The protrusions 5b are provided to prevent the bicycle hub assembly 2 (FIGS. 1 and 2) from being unintentionally removed from the bicycle frame 3 (the front fork 5).

As seen in FIG. 2, the rotor cover 10 further comprises a spacer 22 positioned between the bicycle frame 3 and the mounting portion 14. In the illustrated embodiment, the spacer 22 is provided between the front fork 5 and the mounting portion 14. The spacer 22 is configured to prevent the mounting portion 14 from contacting the protrusion 5b extending from a fork end 5a of the bicycle frame 3. In the illustrated embodiment, the spacer 22 is configured to prevent the mounting portion 14 from contacting the protrusions 5b extending from the fork end 5a of the front fork 5. An axial width of the spacer 22 is larger than an axial length of the protrusions 5b.

The spacer 22 includes a second through-hole 24. The rod 4a of the wheel securing structure 4 extends through the second through-hole 24. The rotor cover 10 and the spacer 22 are mounted to the bicycle frame 3 (the front fork 5) together with the bicycle hub assembly 2. The spacer 22 is contactable with the protrusions 5b of the fork end 5a to prevent the bicycle hub assembly 2 from being unintentionally removed from the bicycle frame 3 (the front fork 5). The spacer 22 is a separate member from the mounting portion 14. However, the spacer 22 can be integrally provided with the mounting portion 14 as a single unitary member.

With the rotor cover 10, it is possible to prevent a user (e.g., a rider or a mechanic) from unintentionally contacting the disc brake rotor 1 heated by friction heat between the disc brake rotor 1 and a friction member of the disc brake caliper 7.

Second Embodiment

A rotor cover 210 in accordance with a second embodiment will be described below referring to FIG. 4. Elements having substantially the same function as those in the first embodiment will be numbered the same here, and will not be described and/or illustrated again in detail here for the sake of brevity.

Figure 4:
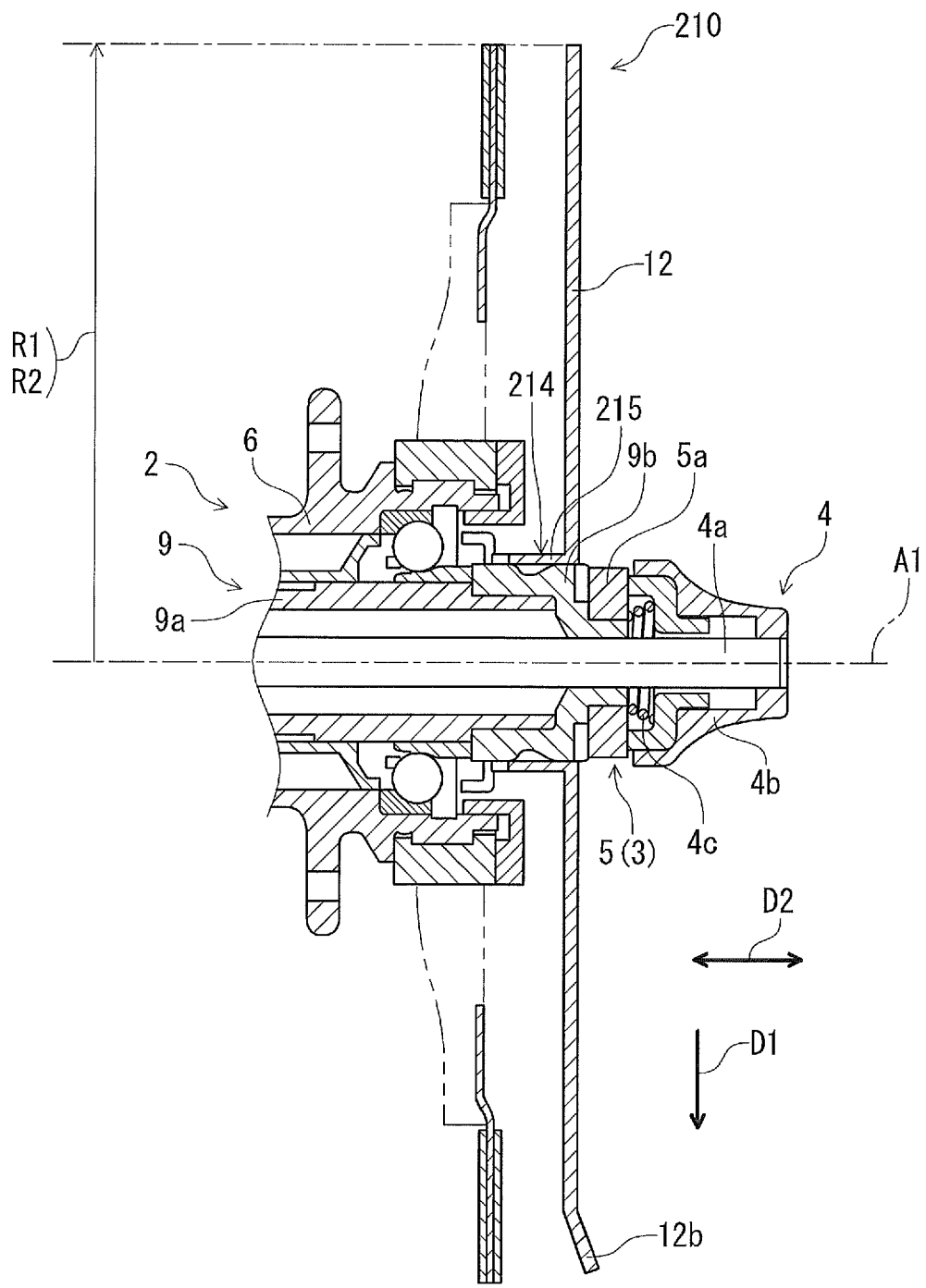
FIG. 4 is a cross-sectional view of a disc brake rotor, a bicycle hub assembly, and a rotor cover in accordance with a second embodiment.

As seen in FIG. 4, the rotor cover 210 comprises the cover portion 12 and a mounting portion 214. The mounting portion 214 is configured to be mounted on the bicycle hub assembly 2. The mounting portion 214 is configured to be mounted on an outer surface of the hub axle 9 of the bicycle hub assembly 2. The hub axle 9 of the bicycle hub assembly 2 includes an inner tube 9a, a first lock nut 9b, and a second lock nut (not shown). The first lock nut 9b is secured to an end of the inner tube 9a. More specifically, the end of the inner tube 9a is screwed in the first lock nut 9b. The second lock nut is secured to the other end of the inner tube 9a.

The first lock nut 9b is configured to engage with the fork end 5a of the front fork 5. The fork end 5a of the front fork 5 is mounted on the first lock nut 9b. The mounting portion 214 is configured to be mounted on an outer surface of the first lock nut 9b of the hub axle 9. However, the mounting portion 214 can be configured to be mounted on an outer surface of the inner tube 9a or the second lock nut (not shown) if needed and/or desired.

The mounting portion 214 includes a cylindrical part 215 extending along the rotational center axis A1. The cover portion 12 extends radially outward from the cylindrical part 215. The cylindrical part 215 extends in the axial direction D2 defined along the rotational center axis A1. The cylindrical part 215 is provided on the outer surface of the first lock nut 9b. The cylindrical part 215 is secured to the hub axle 9 (the first lock nut 9b) by a fastening structure such as adhesive.

With the rotor cover 210, it is possible to obtain the same advantageous effect as the rotor cover 10 in accordance with the first embodiment.

Third Embodiment

A rotor cover 310 in accordance with a third embodiment will be described below referring to FIG. 5. Elements having substantially the same function as those in the above embodiments will be numbered the same here, and will not be described and/or illustrated again in detail here for the sake of brevity.

Figure 5:
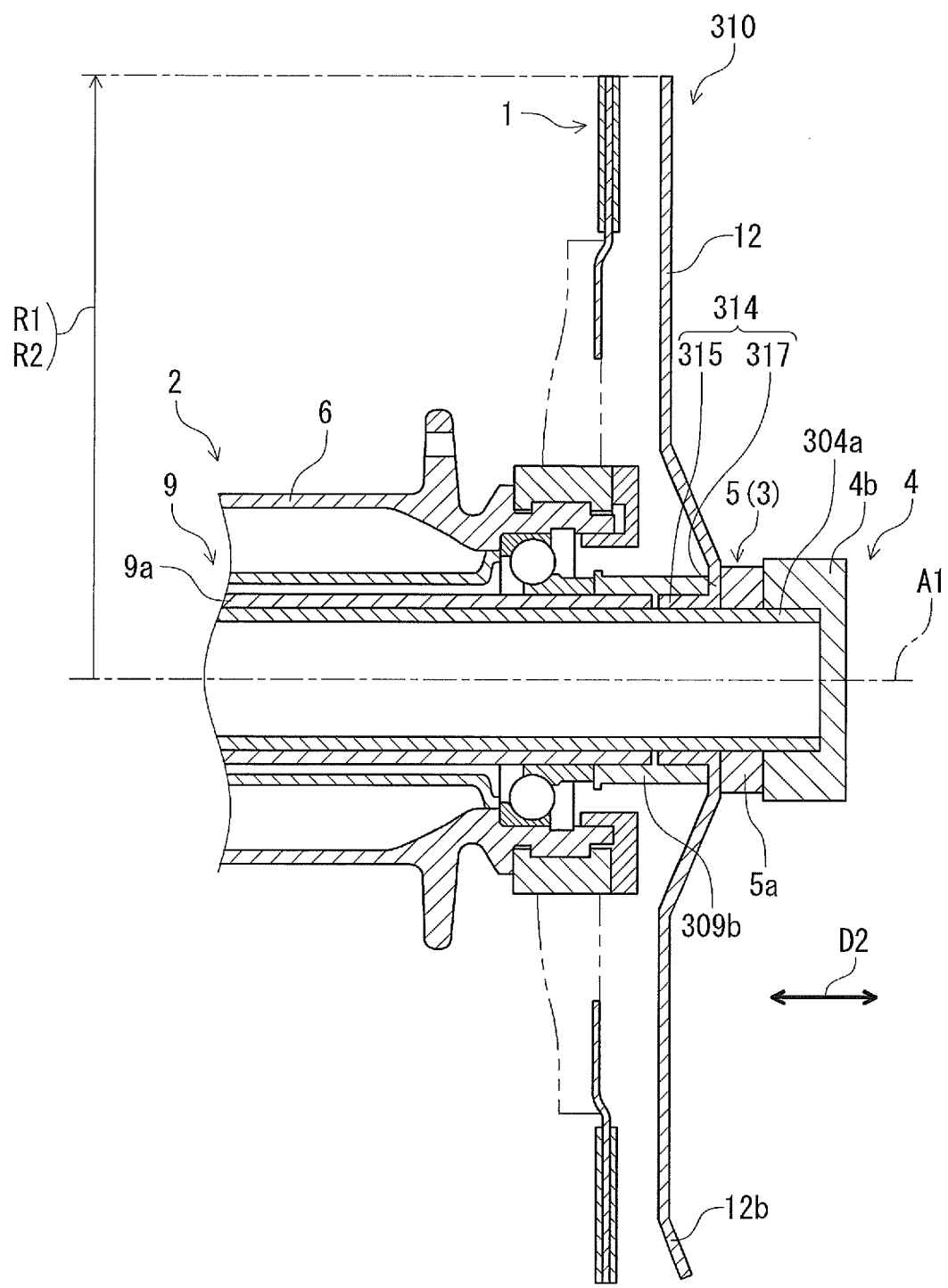
FIG. 5 is a cross-sectional view of a disc brake rotor, a bicycle hub assembly, and a rotor cover in accordance with a third embodiment.

As seen in FIG. 5, the rotor cover 310 comprises the cover portion 12 and a mounting portion 314. The mounting portion 314 is configured to be mounted on the bicycle hub assembly 2. The mounting portion 314 is configured to be mounted on an inner surface of a hub axle 9 of a bicycle hub assembly 2. The bicycle hub assembly 2 has a structure different from the structure of the bicycle hub assembly 2 described in the first embodiment. The hub axle 9 of the bicycle hub assembly 2 includes the inner tube 9a, a first lock nut 309b, and the second lock nut (not shown). The first lock nut 309b is secured to an end of the inner tube 9a. More specifically, the end of the inner tube 9a is screwed in the first lock nut 309b.

A rod 304a of the wheel securing structure 4 has an outer diameter larger than an outer diameter of the rod 4a described in the first embodiment. In the illustrated embodiment, the rod 304a is configured to engage with the fork end 5a of the front fork 5.

The first lock nut 309b has a substantially tubular shape. The mounting portion 314 is configured to be mounted on an inner surface of the first lock nut 309b of the hub axle 9. However, the mounting portion 314 can be configured to be mounted on an inner surface of the inner tube 9a or the second lock nut (not shown) if needed and/or desired.

The mounting portion 314 includes a cylindrical part 315 extending along the rotational center axis A1. The cover portion 12 extends radially outward from the cylindrical part 315. The cylindrical part 315 is provided radially inward of the inner surface of the first lock nut 309b. The cylindrical part 315 is provided radially outward of the outer surface of the rod 304a. The cylindrical part 315 is provided between the inner tube 9a of the hub axle 9 and the rod 304a in a state where the bicycle hub assembly 2 is secured to the bicycle frame 3 (the front fork 5) with the wheel securing structure 4. For example, the cylindrical part 315 is secured to the first lock nut 309b of the hub axle 9 by a fastening structure such as adhesive.

The mounting portion 314 includes an annular part 317 extending radially outward from the cylindrical part 315. The annular part 317 is provided between the hub axle 9 and the fork end 5a in the state where the bicycle hub assembly 2 is secured to the bicycle frame 3 (the front fork 5) with the wheel securing structure 4.

With the rotor cover 310, it is possible to obtain the same advantageous effect as the rotor cover 10 in accordance with the first embodiment.

Fourth Embodiment

A rotor cover 410 in accordance with a fourth embodiment will be described below referring to FIG. 6. The rotor cover 410 has the same configuration as the rotor cover 10 except for a weight described below. Thus, elements having substantially the same function as those in the first embodiment will be numbered the same here, and will not be described and/or illustrated again in detail here for the sake of brevity.

Figure 6:
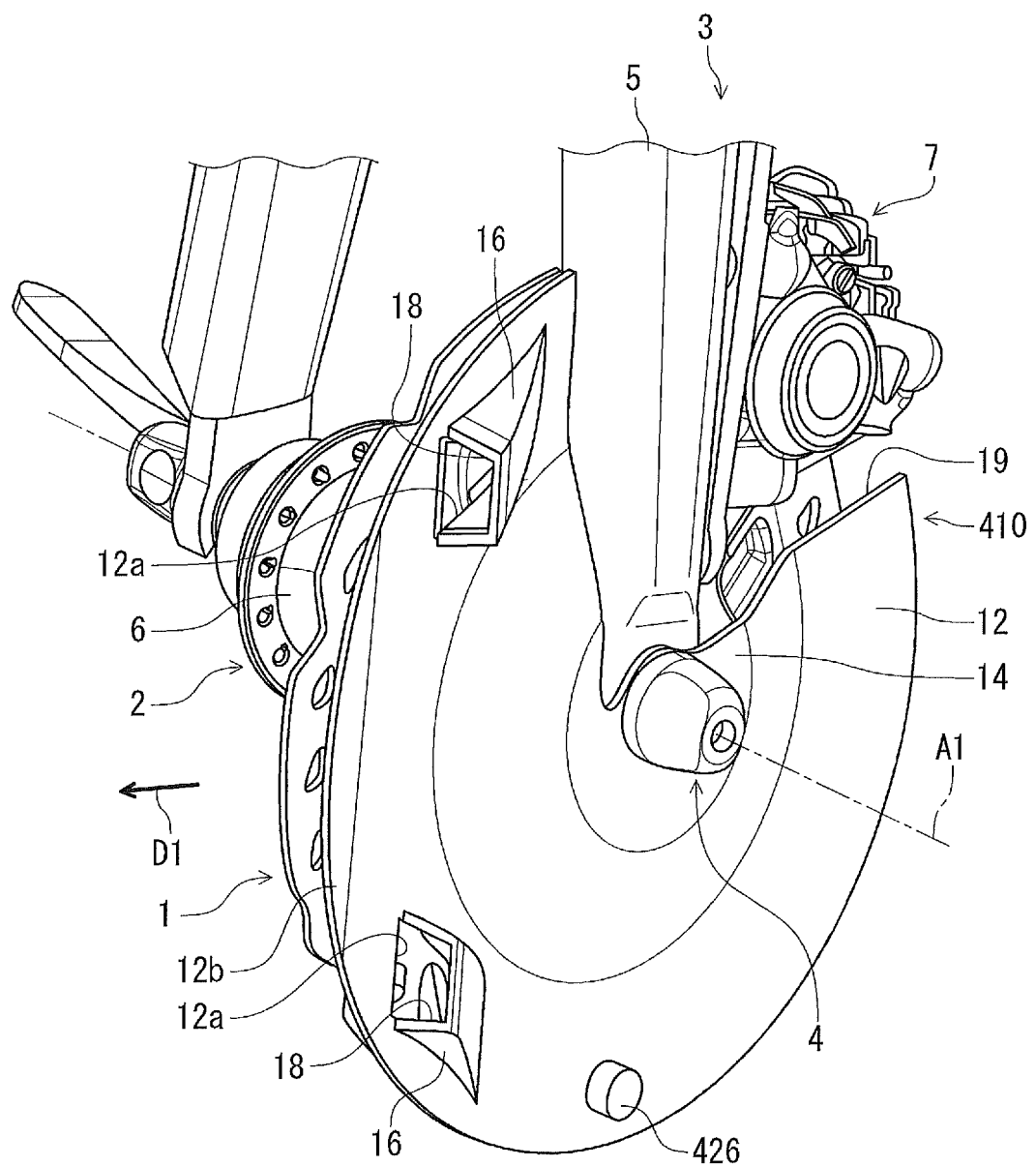
FIG. 6 is a perspective view of a rotor cover in accordance with a fourth embodiment which is mounted on a bicycle hub assembly.

As seen in FIG. 6, the rotor cover 410 comprises the cover portion 12 and the mounting portion 14. Unlike the rotor cover 10 in accordance with the first embodiment, the rotor cover 410 further comprises a weight 426 attached to the cover portion 12. The weight 426 is disposed below the mounting portion 14 in a state where the mounting portion 14 is mounted on the bicycle hub assembly 2. In the illustrated embodiment, the weight 426 is spaced apart from the mounting portion 14 and the rotational center axis A1 in a radial direction of the rotor cover 410.

Before the bicycle hub assembly 2 is secured to the front fork 5 with the wheel securing structure 4, the rotor cover 410 is rotatable relative to the front fork 5. In this state, the rotor cover 410 is positioned by the weight 426 in a circumferential direction of the rotor cover 410. More specifically, the rotor cover 410 is positioned so that the weight 426 is disposed under the mounting portion 14. Accordingly, it is possible to easily position the rotor cover 410 in the circumferential direction.

Fifth Embodiment

A rotor cover 510 in accordance with a fifth embodiment will be described below referring to FIG. 7. The rotor cover 510 has the same configuration as the rotor cover 10 except for the cover portion 12. Thus, elements having substantially the same function as those in the above embodiments will be numbered the same here, and will not be described and/or illustrated again in detail here for the sake of brevity.

Figure 7:
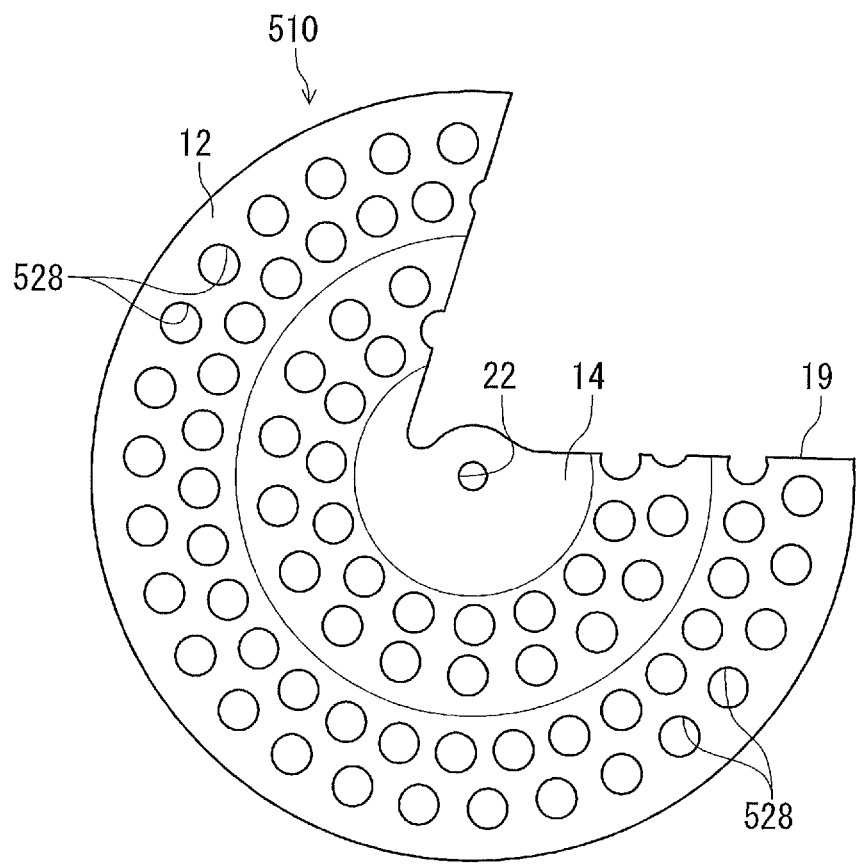
FIG. 7 is an elevational view of a rotor cover in accordance with a fifth embodiment.

As seen in FIG. 7, in the rotor cover 510, the cover portion 12 includes a plurality of holes 528 configured to reduce force applied to the cover portion 12 from cross wind. In the illustrated embodiment, each of the holes 528 has an inner diameter larger than an inner diameter of the first through-hole 20 of the mounting portion 14. It is preferable that a proportion of a total area of the holes 528 to an area of the rotor cover 510 is equal to or greater than a specific value (e.g., 20%). The arrangement, the size, and/or the shape of the holes are not limited to the illustrated embodiment.

With the rotor cover 510, it is possible to obtain the same advantageous effect as the rotor cover 10 in accordance with the first embodiment. Furthermore, with the rotor cover 510, it is possible to reduce effect (e.g., flapping and/or deforming of the rotor cover 510) caused by the cross wind compared with the rotor cover 10 in accordance with the first embodiment. The holes 528 can be applied to the rotor cover in accordance with each of the above embodiments.

Sixth Embodiment

A rotor cover 610 in accordance with a sixth embodiment will be described below referring to FIGS. 8 and 9. Elements having substantially the same function as those in the above embodiments will be numbered the same here, and will not be described and/or illustrated again in detail here for the sake of brevity.

Figure 8:
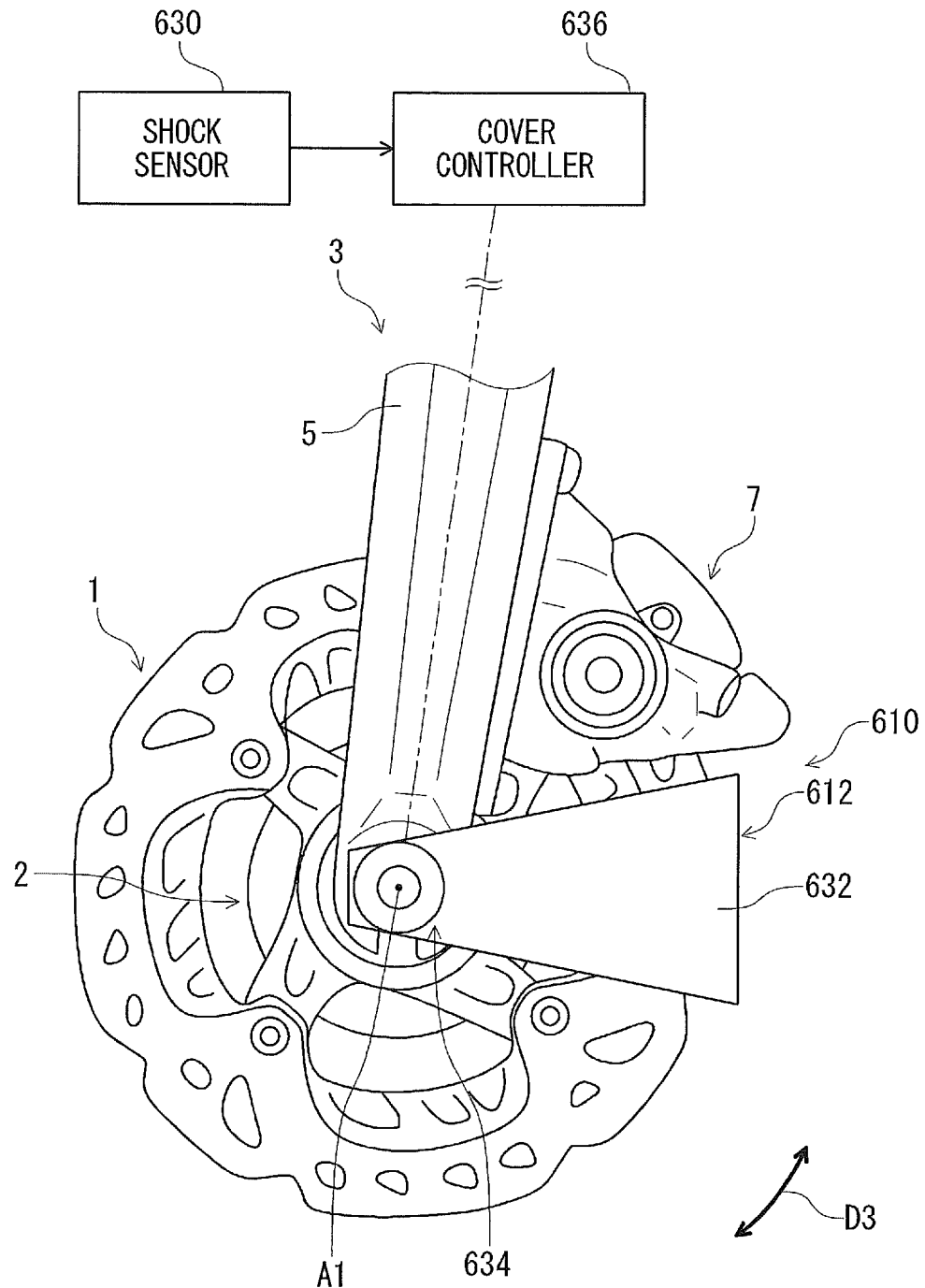
FIG. 8 is a schematic elevational view of a rotor cover in accordance with a sixth embodiment (a retracted state)

As seen in FIG. 8, the rotor cover 610 comprises a shock sensor 630 and a cover portion 612. The shock sensor 630 is configured to sense shock applied to a bicycle. Possible examples of the shock sensor 630 include an acceleration sensor and a piezoelectric ceramic sensor. The shock sensor 630 is mounted on the bicycle frame 3, for example.

The cover portion 612 is configured to at least partially cover the disc brake rotor 1. The cover portion 612 is spreadable to at least cover the disc brake rotor 1 from a retracted state based on the shock sensed by the shock sensor 630. In the illustrated embodiment, the cover portion 612 includes a plurality of cover elements 632. Each of the cover elements 632 has a plate shape and the same shape as each other. The cover elements 632 are pivotably mounted to the bicycle hub assembly 2 about the rotational center axis A1. The cover elements 632 are provided to entirely overlap with each other in the retracted state when viewed along the rotational center axis A1.

Figure 9:
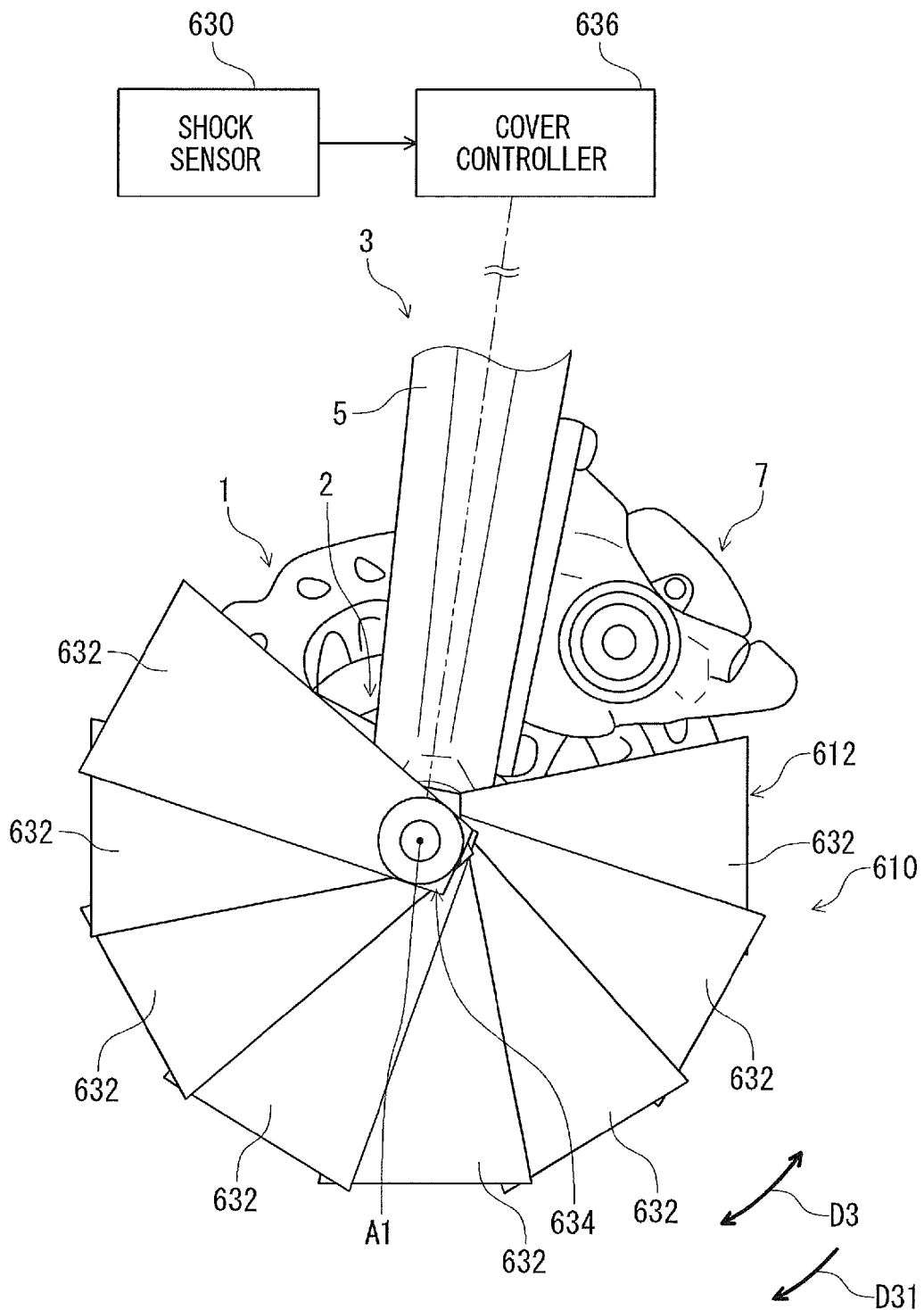
FIG. 9 is a schematic elevational view of the rotor cover illustrated in FIG. 8 (a spread state)

As seen in FIG. 9, the cover elements 632 are provided to partially overlap with each other in a spread state when viewed along the rotational center axis A1. When the cover portion 612 is put into the spread state from the retracted state, the cover elements 632 pivot relative to the front fork 5 about the rotational center axis A1 in a first pivot direction D31 so that the cover portion 612 spreads in a circumferential direction D3 of the disc brake rotor 1 to cover the disc brake rotor 1.

As seen in FIGS. 8 and 9, the rotor cover 610 further includes a cover actuator 634 and a cover controller 636. Electrical power is supplied from a battery (not shown) to the shock sensor 630, the cover actuator 634, and the cover controller 636. The cover actuator 634 is mounted on the bicycle hub assembly 2, for example. The cover actuator 634 is configured to actuate the cover portion 612 (the cover elements 632) between the retracted state and the spread state. Possible examples of the cover actuator 634 include a motor.

The cover controller 636 is mounted on the bicycle frame 3, for example. The cover controller 636 is configured to control the cover actuator 634 to actuate the cover portion 612 between the retracted state and the spread state based on the shock sensed by the shock sensor 630. More specifically, the cover controller 636 controls the cover actuator 634 to pivot the cover elements 632 about the rotational center axis A1 when the shock sensed by the shock sensor 630 is greater than a shock threshold.

In the illustrated embodiment, the cover actuator 634 is configured to actuate the cover portion 612 between the retracted state and the spread state. However, the cover actuator 634 can be configured to release a lock of the cover portion 612. In such an embodiment, the cover portion 612 is biased to the spread state by a biasing element (not shown). The cover actuator 634 is configured to lock the cover portion 612 at the retracted state when the shock sensed by the shock sensor 630 is equal to or less than the shock threshold. The cover actuator 634 is configured to release the lock of the cover portion 612 to put the cover portion 612 into the spread state by the biasing force of the biasing element when the shock sensed by the shock sensor 630 is greater than the shock threshold.

The cover controller 636 includes a central processing unit (CPU), a read only memory (ROM), and a random access memory (RAM). A program stored in the ROM is read into the CPU to perform functions of the cover controller 636. The shock sensed by the shock sensor 630 is temporarily stored in the RAM of the cover controller 636. The cover controller 636 can be integrated into another controller mounted on the bicycle if needed and/or desired.

With the rotor cover 610, the cover portion 612 is spreadable to at least cover the disc brake rotor 1 from the retracted state based on the shock sensed by the shock sensor 630. Accordingly, it is possible to obtain the same advantageous effect as the rotor cover 10 in accordance with the first embodiment while keeping the cooling efficiency of the disc brake rotor 1.

Seventh Embodiment

A rotor cooling apparatus 710 in accordance with a seventh embodiment will be described below referring to FIG. 10. Elements having substantially the same function as those in the above embodiments will be numbered the same here, and will not be described and/or illustrated again in detail here for the sake of brevity.

Figure 10:
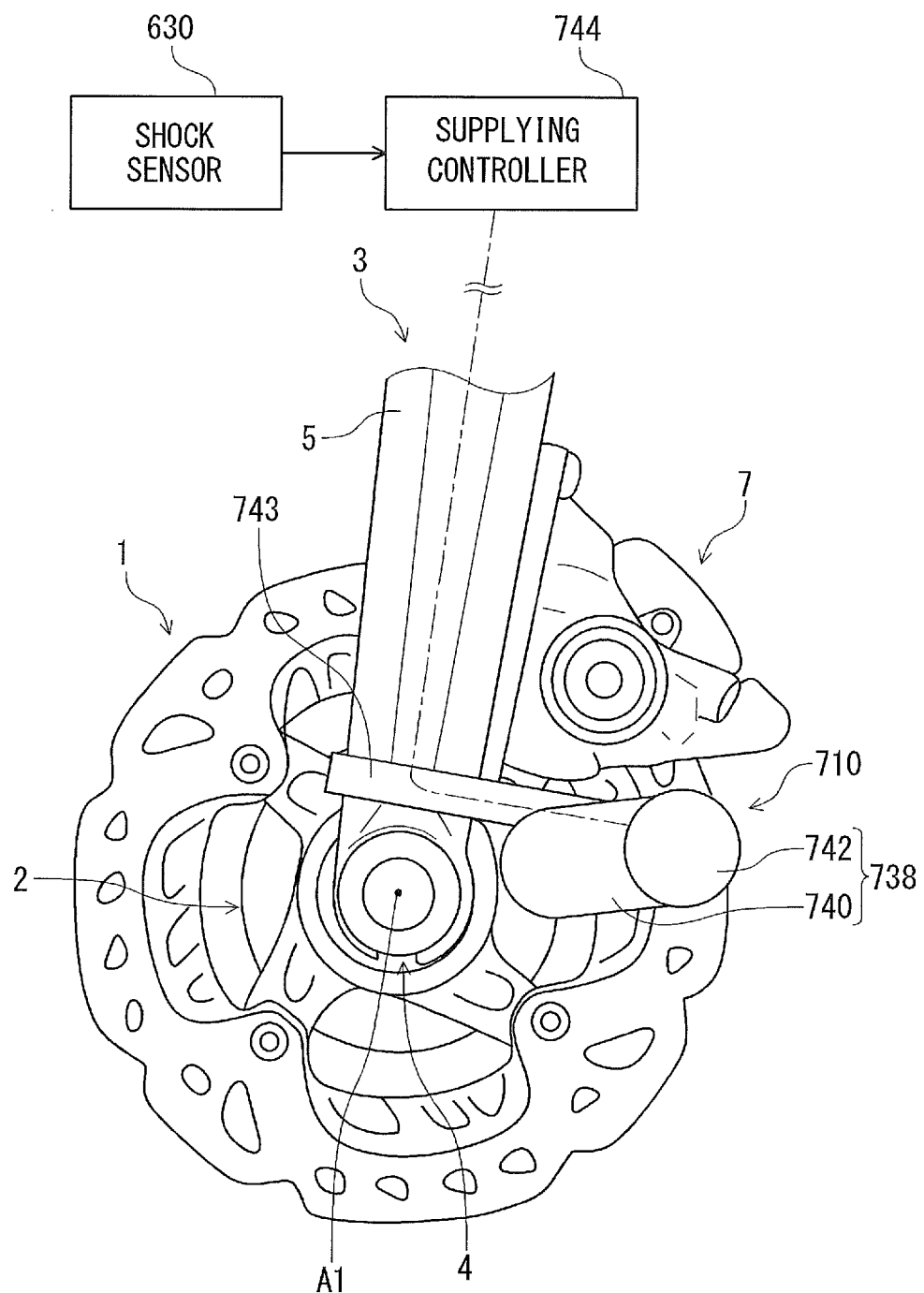
FIG. 10 is a schematic elevational view of a rotor cooling apparatus in accordance with a seventh embodiment.

As seen in FIG. 10, the rotor cooling apparatus 710 comprises the shock sensor 630 and a coolant supplier 738. The shock sensor 630 is configured to sense shock applied to a bicycle. The coolant supplier 738 is configured to supply a coolant to the disc brake rotor 1 based on the shock sensed by the shock sensor 630. Possible examples of the coolant include cooling liquid such as water. The coolant supplier 738 includes a tank 740 is configured to contain the coolant. The coolant supplier 738 further includes a spray device 742 configured to spray the coolant contained in the tank 740 to the disc brake rotor 1. The tank 740 and the spray device 742 are coupled to the front fork 5 of the bicycle frame 3 via a support 743. Possible examples of the spray device 742 include a pump. The coolant supplier 738 can include a blowing-up device configured to blow the tank 740 up.

The rotor cooling apparatus 710 further includes a supplying controller 744. The supplying controller 744 is mounted on the bicycle frame 3, for example. Electrical power is supplied from a battery (not shown) to the shock sensor 630, the coolant supplier 738, and the supplying controller 744. The supplying controller 744 is configured to control the coolant supplier 738 to supply the coolant to the disc brake rotor 1 based on the shock sensed by the shock sensor 630. More specifically, the supplying controller 744 controls the coolant supplier 738 (the spray device 742) to spray the coolant contained in the tank 740 when the shock sensed by the shock sensor 630 is greater than a shock threshold.

The supplying controller 744 includes a central processing unit (CPU), a read only memory (ROM), and a random access memory (RAM). A program stored in the ROM is read into the CPU to perform functions of the supplying controller 744. The shock sensed by the shock sensor 630 is temporarily stored in the RAM of the supplying controller 744. The supplying controller 744 can be integrated into another controller mounted on the bicycle if needed and/or desired.

With the rotor cooling apparatus 710, it is possible to reduce a temperature of the disc brake rotor 1 when the bicycle turns over, preventing a rider from getting burned due to contacting the disc brake rotor 1 heated by friction heat.

Eighth Embodiment

A temperature-level indicator 810 in accordance with an eighth embodiment will be described below referring to FIGS. 11 and 12. Elements having substantially the same function as those in the above embodiments will be numbered the same here, and will not be described and/or illustrated again in detail here for the sake of brevity.

Figure 11:
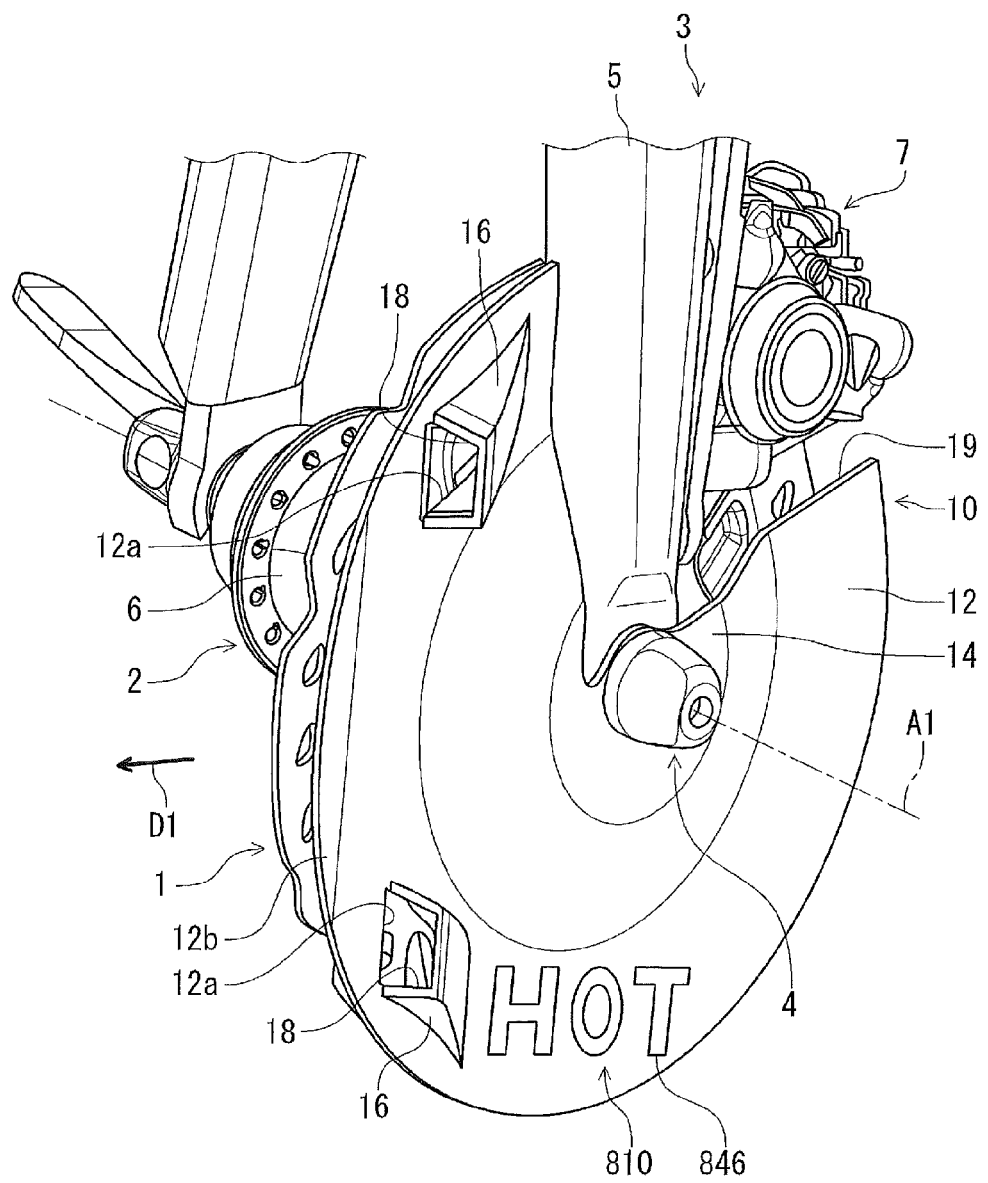
FIG. 11 is a perspective view of a rotor cover with a temperature-level indicator in accordance with an eighth embodiment (a normal temperature level)
Figure 12:
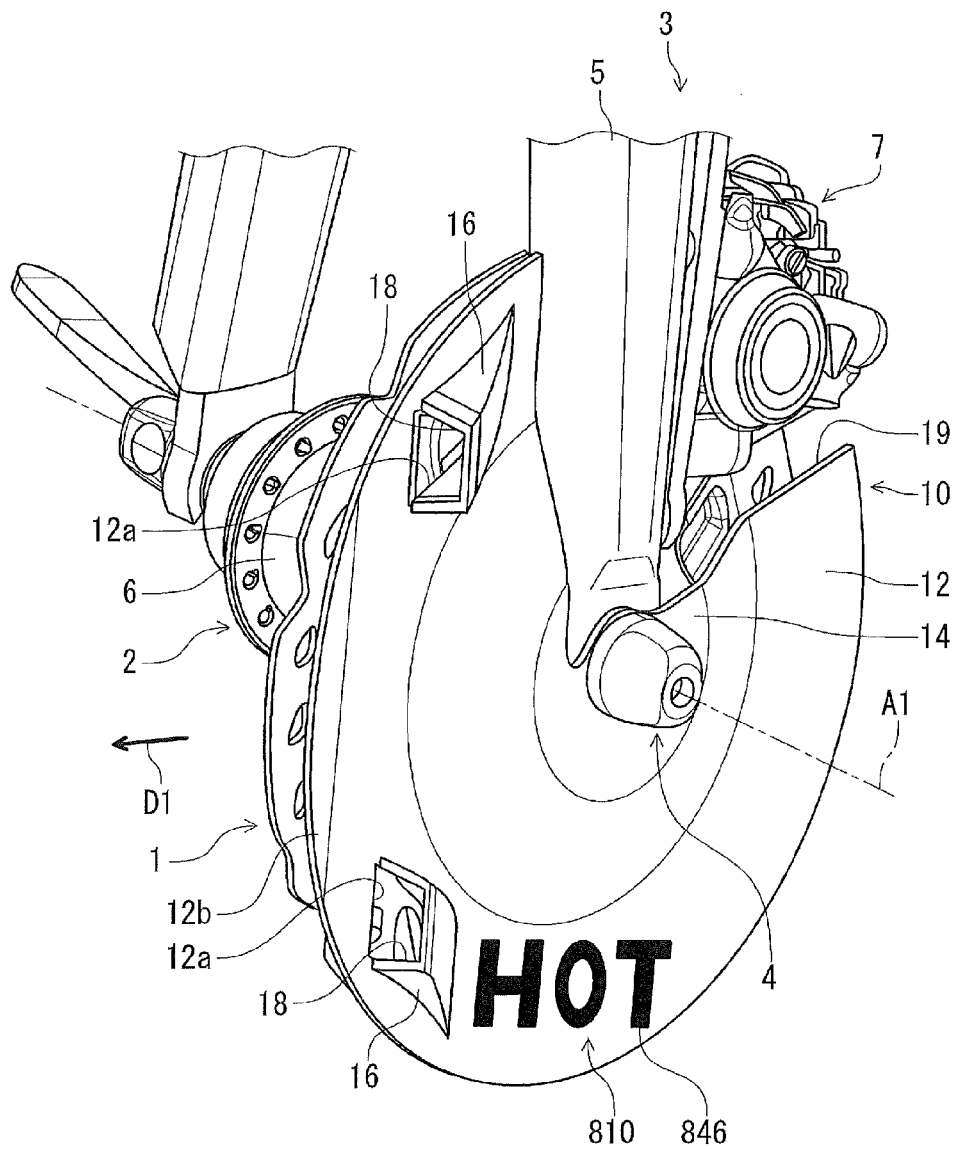
FIG. 12 is a perspective view of the rotor cover illustrated in FIG. 11 (a high temperature level)

As seen in FIG. 11, the temperature-level indicator 810 comprises an indicating member 846 configured to indicate a temperature level of at least one of the disc brake rotor 1 and the rotor cover 10 which is configured to at least partially cover the disc brake rotor 1. In the illustrated embodiment, the indicating member 846 is configured to indicate a temperature level of the rotor cover 10.

The indicating member 846 is configured to change a color of the indicating member 846 in accordance with the temperature level of the rotor cover 10. The indicating member 846 is configured to be attached to the rotor cover 10. In the illustrated embodiment, the indicating member 846 is attached to the cover portion 12 of the rotor cover 10. For example, the indicating member 846 is made of a thermo material having a color changeable between a first color and a second color different from the first color. Possible examples of the thermo material include a thermo ink and a thermo tape. The first color corresponds to a low temperature level. The second color corresponds to a high temperature level. In the illustrated embodiment, as seen in FIGS. 11 and 12, the first color is white and the second color is black.

As seen in FIG. 11, the indicating member 846 is in the first color when the temperature level of the rotor cover 10 is normal. As seen in FIG. 12, the indicating member 846 is in the second color when the temperature level of the rotor cover 10 is higher than a temperature threshold.

With the temperature-level indicator 810, it is possible to inform a user (e.g., a rider or a mechanic) that the temperature level of the rotor cover 10 is high, preventing the user from getting burned due to contacting the rotor cover 10 having a high temperature.

Ninth Embodiment

A temperature-level indicator 910 in accordance with a ninth embodiment will be described below referring to FIGS. 13 and 14. Elements having substantially the same function as those in the above embodiments will be numbered the same here, and will not be described and/or illustrated again in detail here for the sake of brevity.

Figure 13:
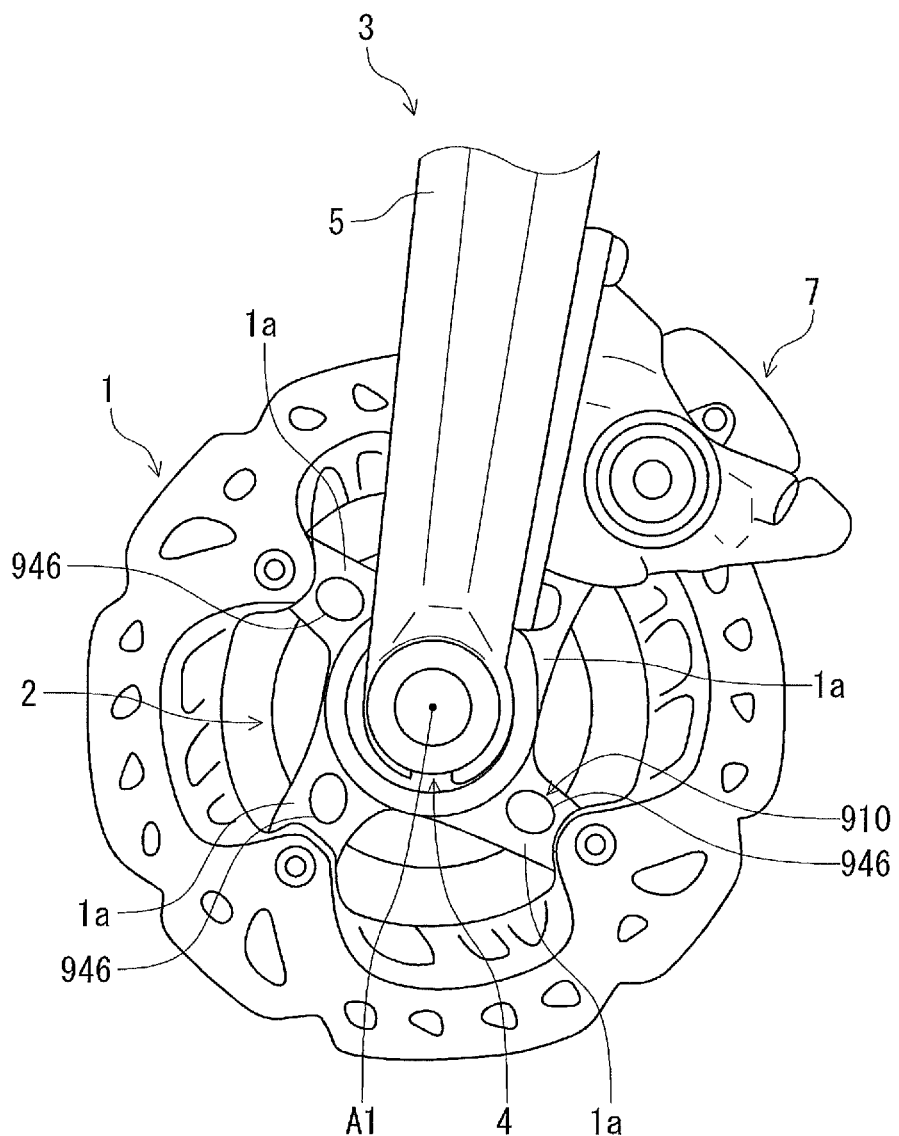
FIG. 13 is an elevational view of a disc brake rotor with a temperature-level indicator in accordance with a ninth embodiment (a normal temperature level)
Figure 14:
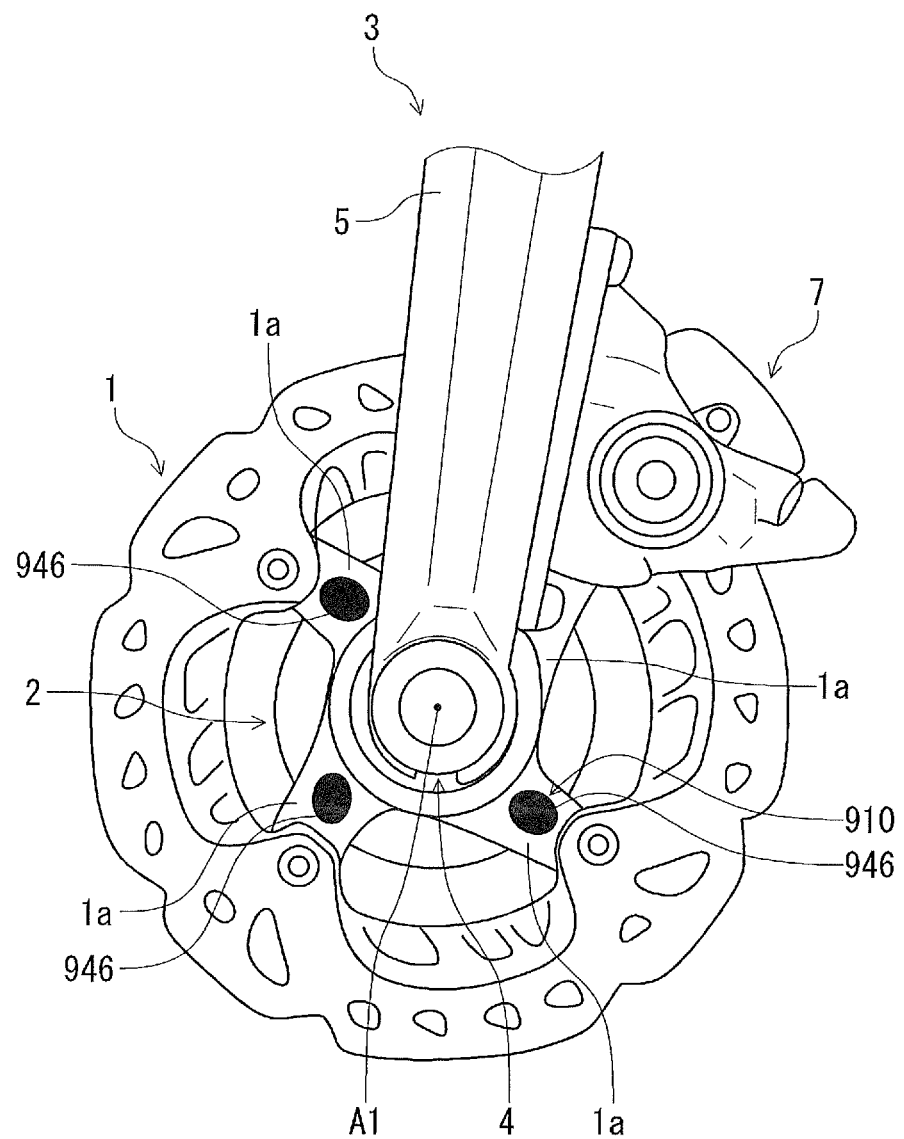
FIG. 14 is an elevational view of the disc brake rotor in accordance with the ninth embodiment (a high temperature level)

As seen in FIG. 13, the temperature-level indicator 910 comprises an indicating member 946 configured to indicate a temperature level of at least one of the disc brake rotor 1 and the rotor cover 10 which is configured to at least partially cover the disc brake rotor 1. In the illustrated embodiment, unlike the eighth embodiment, the indicating member 946 is configured to indicate a temperature level of the disc brake rotor 1.

The indicating member 946 is configured to change a color of the indicating member 946 in accordance with the temperature level of the disc brake rotor 1. The indicating member 946 is configured to be attached to the disc brake rotor 1. In the illustrated embodiment, the indicating members 946 are respectively attached to arm portions 1a of the disc brake rotor 1. At least one indicating member 946 can be attached at least one arm portion 1a or other portion of the disc brake rotor 1 if needed and/or desired.

For example, the indicating member 946 is made of a thermo material having a first color and a second color different from the first color. Possible examples of the thermo material include a thermo ink and a thermo tape. The first color corresponds to a low temperature level. The second color corresponds to a high temperature level. In the illustrated embodiment, as seen in FIGS. 13 and 14, the first color is white and the second color is black.

As seen in FIG. 13, the indicating member 946 indicates the first color when the temperature level of the disc brake rotor 1 is normal. As seen in FIG. 14, the indicating member 946 indicates the second color when the temperature level of the disc brake rotor 1 is higher than a temperature threshold.

With the temperature-level indicator 910, it is possible to inform a user (e.g., a rider or a mechanic) that the temperature level of the disc brake rotor 1 is high, preventing the user from getting burned due to the disc brake rotor 1 heated by friction heat.

Tenth Embodiment

A temperature-level indicator 1010 in accordance with a tenth embodiment will be described below referring to FIGS. 15 to 17. Elements having substantially the same function as those in the above embodiments will be numbered the same here, and will not be described and/or illustrated again in detail here for the sake of brevity.

Figure 15:
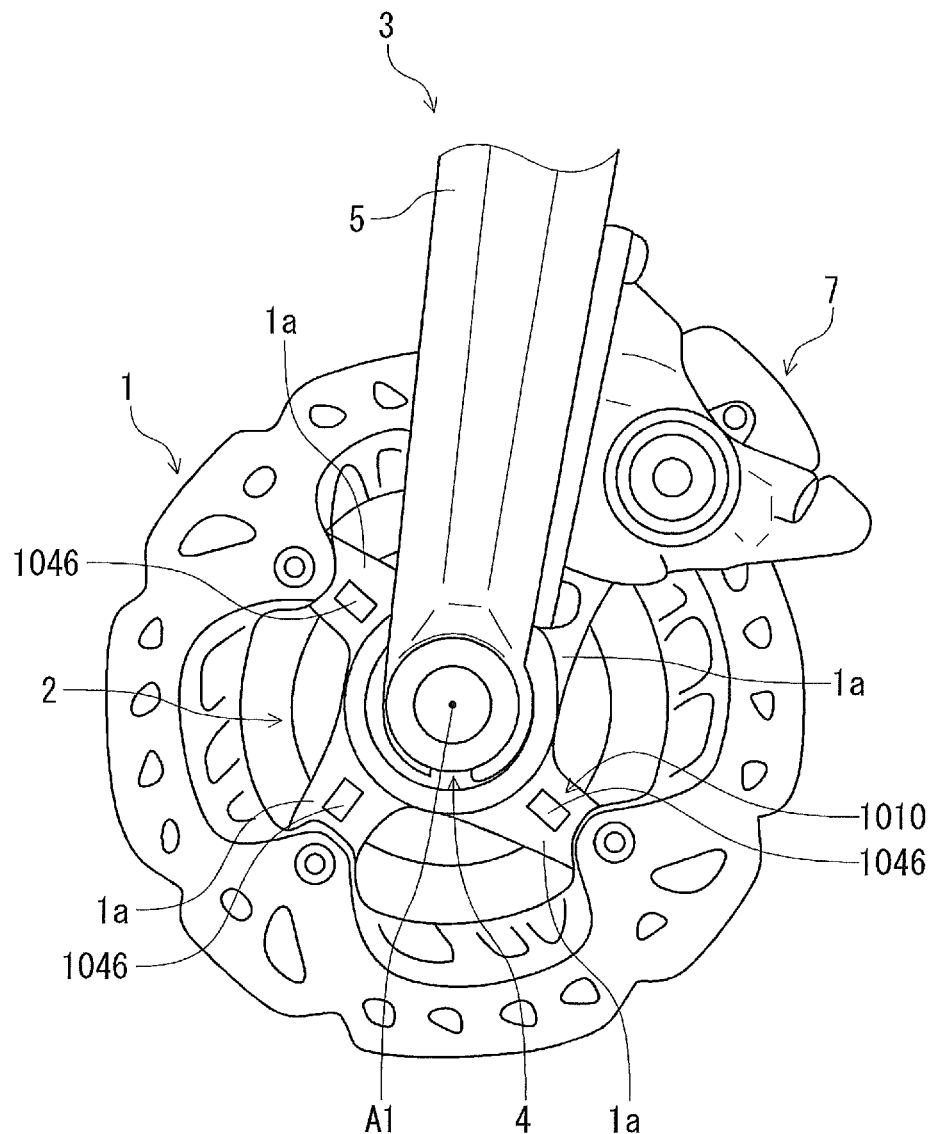
FIG. 15 is an elevational view of a disc brake rotor with a temperature-level indicator in accordance with a tenth embodiment.

As seen in FIG. 15, the temperature-level indicator 1010 comprises an indicating member 1046 configured to indicate a temperature level of at least one of the disc brake rotor 1 and the rotor cover 10 which is configured to at least partially cover the disc brake rotor 1. In the illustrated embodiment, the indicating member 1046 is configured to indicate a temperature level of the disc brake rotor 1.

The indicating member 1046 is configured to change a color of the indicating member 1046 in accordance with the temperature level of the disc brake rotor 1. The indicating member 1046 is configured to be attached to the disc brake rotor 1. In the illustrated embodiment, the indicating members 1046 are attached to the arm portions 1a of the disc brake rotor 1. At least one indicating member 1046 can be attached at least one arm portion 1a or other portion of the disc brake rotor 1 if needed and/or desired.

For example, the indicating member 1046 is made of material deformable between a first shape and a second shape different from the first shape in accordance with a temperature. Possible examples of material of the indicating member 1046 include a shape-memory alloy and a bimetallic strip. The first shape corresponds to a low temperature level. The second shape corresponds to a high temperature level. In the illustrated embodiment, as seen in FIGS. 16 and 17, the first shape is a flat shape and the second shape is a curved shape.

Figure 16:
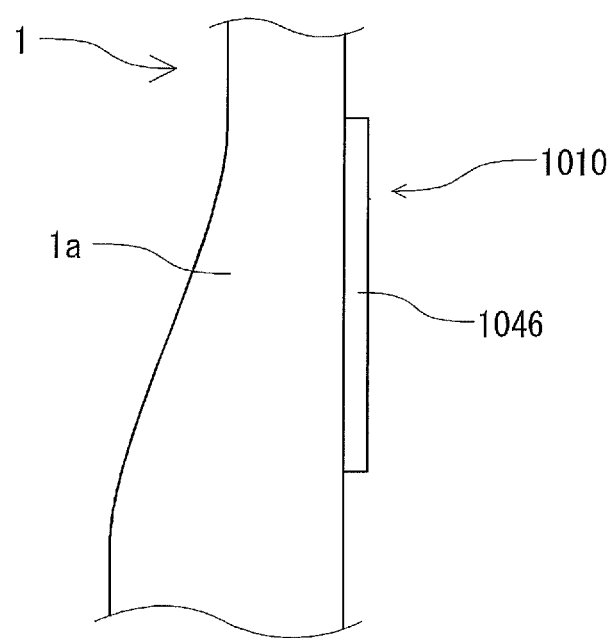
FIG. 16 is a partial front view of the disc brake rotor with the temperature-level indicator illustrated in FIG. 15 (a normal temperature level)
Figure 17:
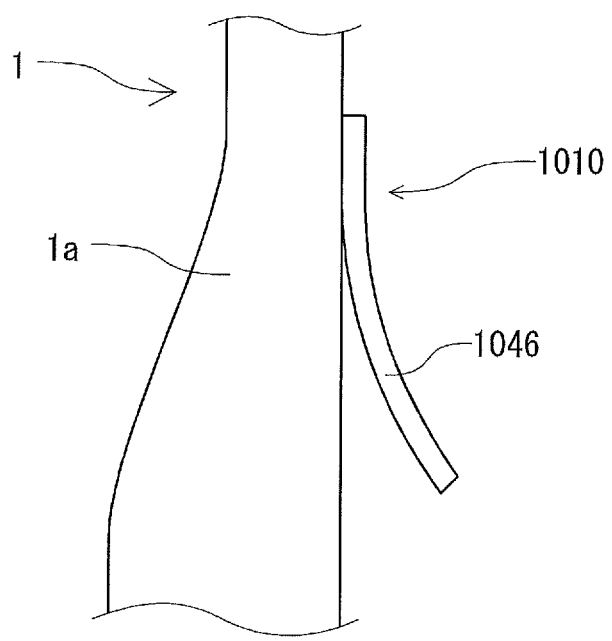
FIG. 17 is a partial front view of the disc brake rotor with the temperature-level indicator illustrated in FIG. 15 (a high temperature level).

As seen in FIG. 16, the indicating member 1046 is in the first shape when the temperature level of the disc brake rotor 1 is normal. As seen in FIG. 17, the indicating member 1046 is in the second shape when the temperature level of the disc brake rotor 1 is higher than a temperature threshold.

With the temperature-level indicator 1010, it is possible to inform a user (e.g., a rider or a mechanic) that the temperature level of the disc brake rotor 1 is high, preventing the user from getting burned due to the disc brake rotor 1 heated by friction heat.

It will be apparent to those skilled in the bicycle field from the present disclosure that constructions of the above embodiments can be combined if needed and/or desired. For example, the rotor cooling apparatus 710 in accordance with the seventh embodiment can be applied to the rotor cover 610 in accordance with the sixth embodiment. Furthermore, the temperature-level indicators 810 and 910 in accordance with the eighth and ninth embodiments can be combined.

In the present application, the term "attached" or "attaching", as used herein, can encompass configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rotor cover comprising:
   a mounting portion configured to be mounted on a bicycle hub assembly;
   a cover portion configured to at least partially cover a bicycle disc brake rotor mounted on the bicycle hub assembly in a state where the mounting portion is mounted on the bicycle hub assembly; and
   an air intake provided on the cover portion to intake air into a space between the cover portion and the bicycle disc brake rotor, the cover portion including a first outlet opening, the air intake including a first intake wall extending from the cover portion to define a first inlet opening, the first intake wall connecting the first inlet opening to the first outlet opening.

2. The bicycle rotor cover according to claim 1, wherein the cover portion radially outwardly extends from the mounting portion with respect to a rotational center axis of the bicycle hub assembly.

3. The bicycle rotor cover according to claim 1, wherein the mounting portion is configured to be secured relative to a bicycle frame with a wheel securing structure of the bicycle hub assembly in the state where the mounting portion is mounted on the bicycle hub assembly.

4. The bicycle rotor cover according to claim 3, wherein the mounting portion is configured to be positioned between the bicycle frame and a lock member of the wheel securing structure in a state where the mounting portion is secured relative to the bicycle frame with the wheel securing structure, the lock member being secured to an end of a rod of the wheel securing structure.

5. The bicycle rotor cover according to claim 4, further comprising:
   a spacer positioned between the bicycle frame and the mounting portion in the state where the mounting portion is secured relative to the bicycle frame with the wheel securing structure.

6. The bicycle rotor cover according to claim 5, wherein the spacer is configured to prevent the mounting portion from contacting a protrusion extending from a fork end of the bicycle frame in the state where the mounting portion is secured relative to the bicycle frame with the wheel securing structure.

7. The bicycle rotor cover according to claim 3, wherein the mounting portion includes a first through-hole, and the first through-hole being configured to receive a rod of the wheel securing structure extending through the first through-hole in a state where the mounting portion is secured relative to the bicycle frame with the wheel securing structure.

8. The bicycle rotor cover according to claim 7, wherein the first through-hole is configured to be positioned between the bicycle frame and a lock member of the wheel securing structure in the state where the mounting portion is secured relative to the bicycle frame with the wheel securing structure, the lock member being secured to an end of the rod.

9. The bicycle rotor cover according to claim 1, wherein at least one of the cover portion and the mounting portion is configured to avoid contacting a protrusion extending from a fork end of the bicycle frame in the state where the mounting portion is mounted on the bicycle hub assembly.

10. The bicycle rotor cover according to claim 1, wherein the mounting portion is configured to be mounted on an outer surface of a hub axle of the bicycle hub assembly in the state where the mounting portion is mounted on the bicycle hub assembly.

11. The bicycle rotor cover according to claim 1, wherein the mounting portion is configured to be mounted on an inner surface of a hub axle of the bicycle hub assembly in the state where the mounting portion is mounted on the bicycle hub assembly.

12. The bicycle rotor cover according to claim 1, further comprising:
    a weight attached to the cover portion, wherein
    the weight is disposed below the mounting portion in the state where the mounting portion is mounted on the bicycle hub assembly.

13. The bicycle rotor cover according to the claim 1, wherein
    a maximum outer radius of the cover portion is greater than or equal to a maximum outer radius of the bicycle disc brake rotor.

14. The bicycle rotor cover according to the claim 1, wherein
    at least one of the cover portion and the mounting portion is made of a metallic material.

15. The bicycle rotor cover according to the claim 1, wherein
    at least one of the cover portion and the mounting portion is made of a resin material.

16. The bicycle rotor cover according to claim 1, wherein the air intake includes the first inlet opening configured to face toward a traveling direction of a bicycle in the state where the mounting portion is mounted on the bicycle hub assembly.

17. The bicycle rotor cover according to claim 1, wherein the cover portion includes a plurality of holes configured to reduce force applied to the cover portion from cross wind in the state where the mounting portion is mounted on the bicycle hub assembly.

18. The bicycle rotor cover according to claim 1, wherein the mounting portion is configured to be provided on an opposite side of the bicycle disc brake rotor relative to a bicycle frame in a state where the mounting portion is secured relative to the bicycle frame with a wheel securing structure of the bicycle hub assembly.

19. The bicycle rotor cover according to claim 1, wherein the cover portion includes an offset part provided radially outward of the mounting portion with respect to a rotational center axis of the bicycle hub assembly, and the offset part is offset from the mounting portion in an axial direction parallel to the rotational center axis.

20. The bicycle rotor cover according to claim 19, wherein the cover portion includes a coupling part coupling the offset part to the mounting portion, and the coupling part extends from the mounting portion to the cover portion to be inclined with respect to the axial direction.

21. The bicycle rotor cover according to claim 1, wherein the cover portion includes a second outlet opening, and the air intake includes a second intake wall extending from the cover portion to define a second inlet opening and connecting the second inlet opening to the second outlet opening.

22. A bicycle rotor cover comprising:

a mounting portion configured to be mounted on a bicycle hub assembly;

a cover portion configured to at least partially cover a bicycle disc brake rotor mounted on the bicycle hub assembly in a state where the mounting portion is mounted on the bicycle hub assembly, the cover portion including an offset part provided radially outward of the mounting portion with respect to a rotational center axis of the bicycle hub assembly, the offset part being offset from the mounting portion in an axial direction parallel to the rotational center axis; and an air intake being provided on the offset part, the offset part including a first outlet opening, and the air intake including a first intake wall extending from the offset part to define a first inlet opening, the first intake wall connecting the first inlet opening to the first outlet opening.

23. The bicycle rotor cover according to claim 22, wherein the offset part includes a second outlet opening, and the air intake includes a second intake wall extending from the offset part to define a second inlet opening and connecting the second inlet opening to the second outlet opening.

* * * * *